Sept. 29, 1931.  J. J. MACE  1,825,192
WINDOW VENTILATOR FOR AUTOS
Filed Nov. 27, 1928  2 Sheets-Sheet 2
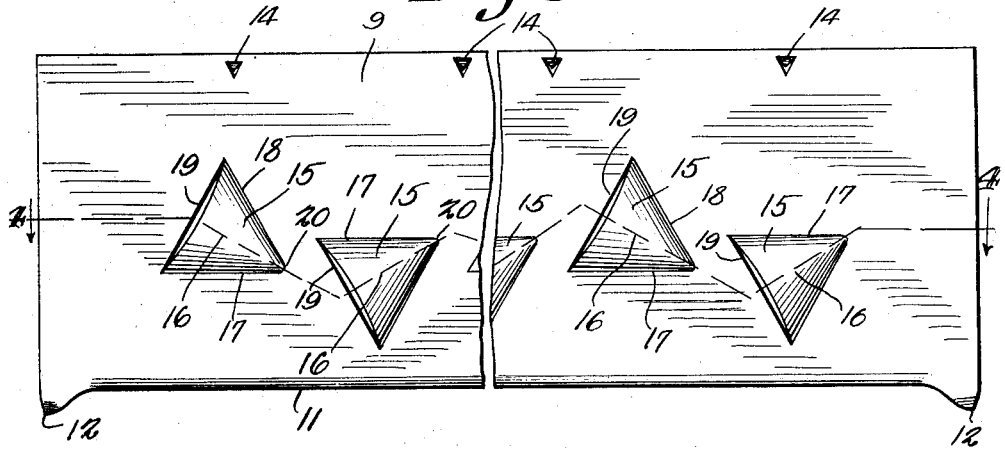
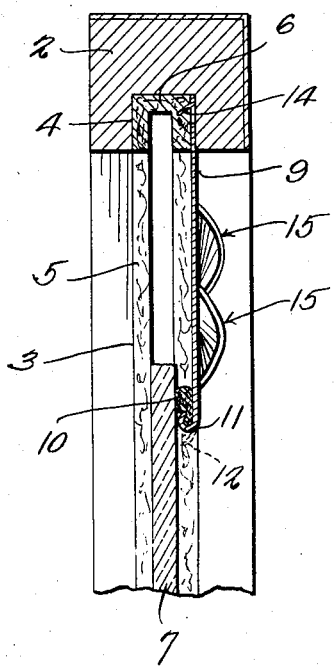
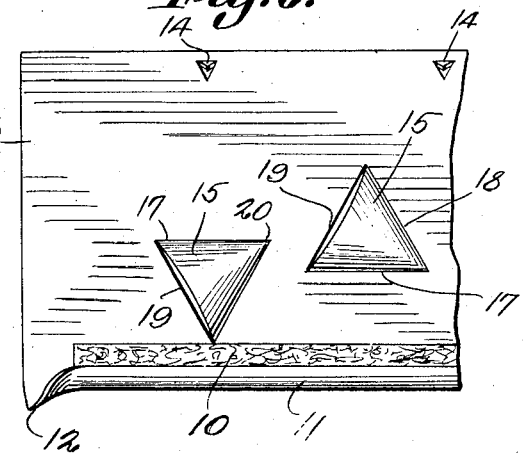
John J. Mace
Inventor
By C. A. Snow & Co.
Attorneys.

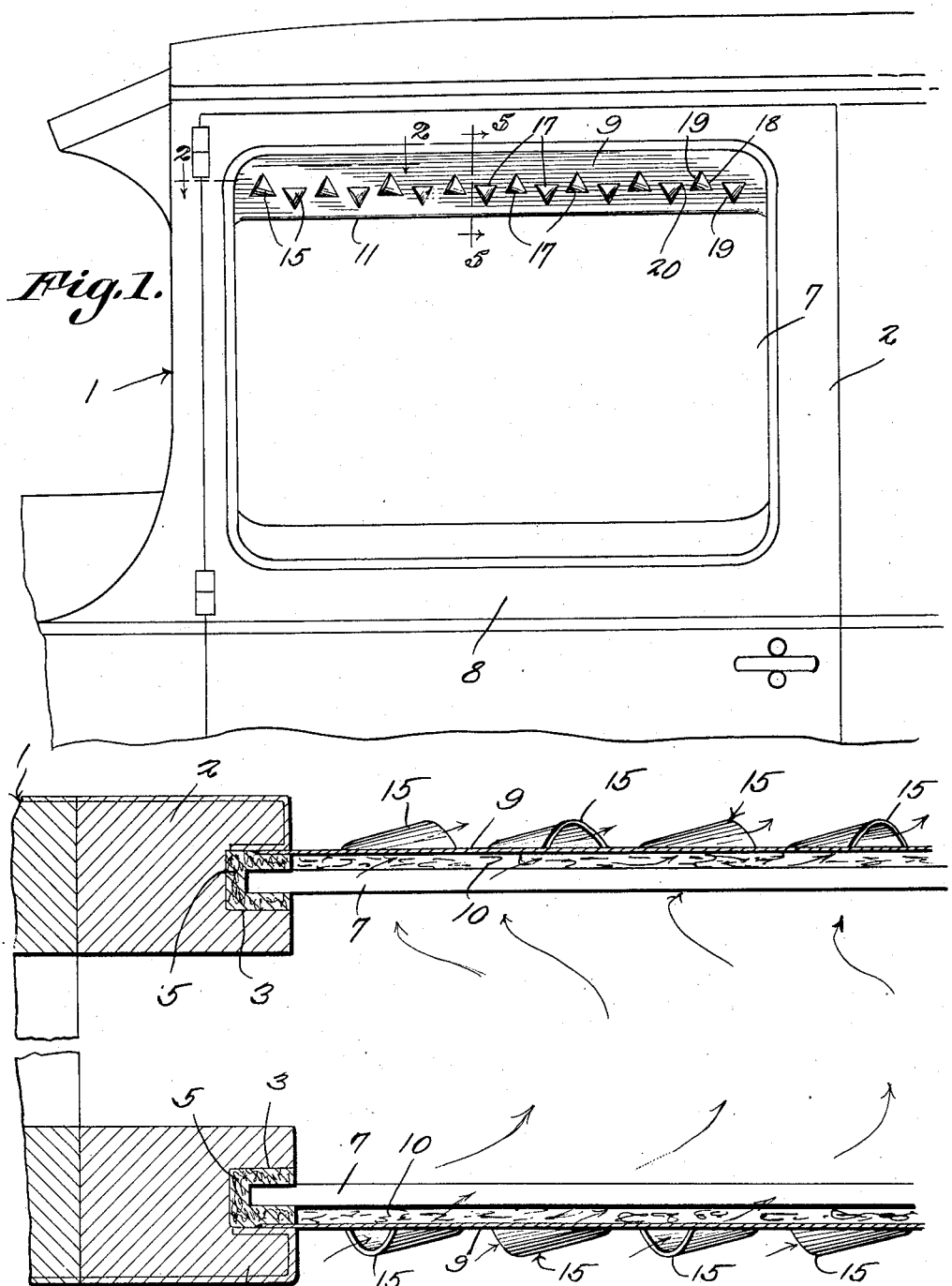

Patented Sept. 29, 1931

1,825,192

UNITED STATES PATENT OFFICE

JOHN JACOB MACE, OF YORK, PENNSYLVANIA

WINDOW VENTILATOR FOR AUTOS

Application filed November 27, 1928. Serial No. 322,250.

The device forming the subject matter of this application is a ventilator for automobiles. The objects of the invention are to provide a ventilator which will not whistle as the wind passes through it; to provide a ventilator which will supply an adequate amount of air to the vehicle without producing a draft; to provide a ventilator the operation of which may be regulated to conform with varying conditions of atmosphere and temperature; to provide a ventilator of such as will permit it to be sprung into position; to provide a ventilator having air vents of such form and relative position that incoming air streams impinge upon and disrupt each other to such extent that a perceptible draft is not created; to provide novel means for holding the ventilator in place; and, generally, to enhance the utility of devices of that type to which the invention appertains.

A preferred form of the invention has been shown but it is to be understood that a mechanic, working within the scope of what is claimed, may make such changes as his skill may suggest, without departing from the spirit of the invention.

In the accompanying drawings, which are to be considered in connection with the following specification, Figure 1 shows in side elevation, a part of the vehicle wherein the device forming the subject matter of this application has been mounted;

Figure 2 is a horizontal section on the line 2—2 of Figure 1 showing opposite sides of the vehicle, and how the ventilators are to be arranged therein;

Figure 3 is an elevation of one of the ventilators per se, parts being broken away;

Figure 4 is a longitudinal section which has been take on the line 4—4 of Figure 3;

Figure 5 is a section on the line 5—5 of Figure 1;

Figure 6 is a fragmental rear elevation showing a part of one of the ventilators.

In the accompanying drawings, the numeral 1 marks a vehicle having door frames 2. In the frame 2 (or elsewhere on the vehicle) there are vertical grooves 3 cooperating with horizontal grooves 4, packings 5 being disposed in the grooves 3, and the grooves 4 containing packings 6. The packings 5 and 6 are made of felt, or an equivalent substance, according to the present practice, and they are U-shaped in cross section, as Figures 5 and 2 will show. The numeral 7 marks a panel, such as a pane of glass, mounted to slide in the U-shaped packings 5 and 6, and to be lowered, more or less, into the bottom part 8 (Figure 1) of the door frame 2.

The construction described above is a common one, and no novelty is claimed for it, saving insofar as it may enter into combination with novel parts to be described hereinafter.

In carrying out the invention, there is provided a plate 9 of any suitable material, such as thin metal. A compressible packing, generally made of felt and marked by the numeral 10, is disposed along the lower longitudinal edge of the plate 9. The said edge of the plate 9 is turned over into a trough-shaped bead 11 which receives and holds the packing 10, as shown in Figure 5. The corners of the bead 11 are turned outwardly to form prongs 12. Adjacent to its upper longitudinal edge, the plate 9 is supplied with prongs 14, which, preferably, are struck out of the plate.

The prongs 14 and 12 are downwardly and outwardly inclined, to permit the plate 9 to be pushed upwardly to place between the packing 5—6 and the frame 2, the corner prongs 12 cooperating with the vertical portions 5 of the packing, and the prongs 14 cooperating with the horizontal portion of the packing, as shown in Figure 5. The construction is such that the plate 9 can be shoved up to place in the grooves 3 and 4 without difficulty, but the plate will not slide downwardly after it is in place. The packing 10, preferably, is a little thicker than shown in Figure 5 so that when the window pane or panel 7 is drawn upwardly across the packing, the packing will be compressed somewhat and make a tight joint with the pane or panel.

The plate 9 is supplied with tapered louvers 15 of particonical form. The louvers 15 are struck from the plate 9 to form openings, and the axes 16 (Figure 3) of the grooves are arranged in a zig-zag line. Two of the edges 17 of adjoining grooves are parallel to each other, and the other edge 18 of one of the said adjoining louvers is parallel to the basal edge 19 of the opening formed by the other of said adjoining louvers. The apex 20 of each louver is disposed opposite to the edge 19 of the opening in the next adjoining louver, as Figures 6 and 3 will clearly show.

Referring to Figure 2 of the drawings, it will be seen that, considering the plate 9 on one side of the vehicle, the plate on the opposite side of the vehicle is turned end for end. The result is that the louvers on one side of the vehicle open forwardly, whereas the louvers on the opposite side of the vehicle open rearwardly. Owing to this construction, the air will enter one side of the vehicle and move out of the opposite side of the vehicle thereby promoting ventilation.

Owing to the particular way in which the louvers 15 are constructed, adequate ventilation within the car will be afforded and there will be no whistling, as the air enters the vehicle on one side or leaves the vehicle on the opposite side.

Owing to the relative positions of the slidable panel and the ventilator adjacent thereto the amount of ventilation may be controlled as desired by raising or lowering the panel.

I claim:—

1. A window ventilator comprising a plate having an opening for the passage of air, a packing disposed along one edge of the plate, that edge of the plate being formed into a trough-shaped bead which receives the packing to hold it on the plate, one corner of the bead being turned outwardly to form a support-engaging prong for the upholding of the plate.

2. A window ventilator comprising a plate provided along its upper edge and at its ends with outstanding prongs, the prongs being downwardly and outwardly inclined to permit the plate to be pushed upwardly to place in contact with the packing in a window frame, the prongs constituting packing-engaging means for holding the plate in place, the plate having an opening for the passage of air.

3. A window ventilator comprising a plate from which tapered louvers are struck, the axes of all of the louvers being arranged in a single zig-zag line.

4. A window ventilator comprising a plate from which tapered louvers are struck, to define openings, two of the edges of adjoining louvers being parallel to each other, and the other edge of one of said adjoining louvers being parallel to the basal edge of the opening formed by the other of said adjoining louvers.

5. A window ventilator comprising a single plate from which tapered louvers are struck to form slots, the axes of all of the louvers being arranged in a zig-zag line, all of the slots of the plates opening in the same direction lengthwise of the plate.

In testimony that I claim the foregoing as my own, I have hereto affixed my signature.

JOHN JACOB MACE.